(12) United States Patent
Underwood

(10) Patent No.: US 6,259,354 B1
(45) Date of Patent: Jul. 10, 2001

(54) SYSTEM AND METHODS FOR VEHICLE IDENTIFICATION NUMBER VALIDATION

(75) Inventor: Troy R. Underwood, Sacramento, CA (US)

(73) Assignee: FDI Consulting, Inc., Sacramento, CA (US)

( * ) Notice: Subject to any disclaimer, the term of this patent is extended or adjusted under 35 U.S.C. 154(b) by 0 days.

(21) Appl. No.: 09/144,550

(22) Filed: Sep. 1, 1998

(51) Int. Cl.[7] .................................................... G07D 7/00
(52) U.S. Cl. ........................................... 340/10.6; 714/819
(58) Field of Search .............................. 340/825.34, 10.6; 364/409; 714/785, 799, 800, 819

(56) References Cited

U.S. PATENT DOCUMENTS

| | | | |
|---|---|---|---|
| 4,989,144 | 1/1991 | Barnett, III | 364/419 |
| 5,521,815 | 5/1996 | Rose, Jr. | 364/409 |
| 5,623,403 | 4/1997 | Highbloom | 395/228 |
| 5,899,978 | 5/1999 | Irwin | 705/1 |

OTHER PUBLICATIONS

"PTS Paperless Title System Electronic Lien & Title Tracking Users Guide—California", Release 3.1, copyright 1993, 1995, FDI Consulting, Inc.

VTTS Vehicle Title Tracking System, Installation and Administration Guide, FDI Consulting, Inc., 1997.

FDI Consulting Inc.[Retrieved on Sep. 8, 1999]. Retrieved from the Internet: <URL:www.fdielt.com/default.htm>.

FDI Consulting Web Site. Various datasheets [online]. Retrieved on Nov. 8, 1999 from the Internet: <URL:www-.fdielt.com/vtts.htm>.

Woodcock, Martha, "Going Paperless: Electronic Title Processing Growing", Credit Card Times, vol. 7, No. 43, p. 24, Oct. 23, 1996.

Marrinan, Michele, "No More Paper: Car Title Filling Goes Electronic", Bank Systems & Technology, vol. 32, No. 5, p. 23, May 1995.

Jooss, Ron, "A 'Golden' Concept", Credit Union Management, vol. 18, No. 5, p. 41, May 1995.

"Chase, Seafirst Buy FDI's Paperless Auto Title System", American Bankder, vol. CLX, No. 54, p. 15, Mar. 21, 1995.

"Banks Switch to Electronic Titles", Bank Advertising News, vol. 19, No. 12, p. 2, Feb. 20, 1995.

Mastracco, Vince, "Chase Manhattan & Seafirst Banks Join Electronic 'Pink Slip' Revolution", Business Wire, s. 1, p. 1, Dec. 26, 1994.

Larson, Mark, "Local Companies Roll Out a Range of New Software", Business Journal Serving Greater Sacramento, vol. 10, No. 15, p. 14, Jul. 5, 1993.

Primary Examiner—Michael Horabik
Assistant Examiner—M Shimizu
(74) Attorney, Agent, or Firm—Knobbe, Martens, Olson & Bear, LLP

(57) ABSTRACT

A method and apparatus is used to of validate a vehicle identification number (VIN). At least a first VIN having a plurality of characters in a plurality of positions is received. At least a first character in a first position of the first VIN to inspected to determine if the first character is included in a first set of valid characters. The first character is identified as being in error when the first character is not in the first set of valid characters. The first character is replaced with a substitute character.

21 Claims, 17 Drawing Sheets

400

| WIDTH | FIELD | FIELD NAME DEC | INDEX | COLLATE | TYPE | NULLS |
|---|---|---|---|---|---|---|
| 10 | 1 | IDCODE | ASC | MACHINE | CHARACTER | NO |
| 30 | 2 | LIEN1 | | | CHARACTER | NO |
| 30 | 3 | LIEN2 | | | CHARACTER | NO |
| 30 | 4 | LIEN3 | | | CHARACTER | NO |
| 30 | 5 | LIEN4 | | | CHARACTER | NO |
| 30 | 6 | LCITY | | | CHARACTER | NO |
| 2 | 7 | LSTATE | | | CHARACTER | NO |
| 10 | 8 | LZIP | | | CHARACTER | NO |
| 2 | 9 | LICENSETYPE | | | CHARACTER | NO |
| 6 | 10 | EXPIRATION | | | CHARACTER | NO |
| 2 | 11 | YEARSOLD | | | CHARACTER | NO |
| 1 | 12 | HULLTYPE | | | CHARACTER | NO |
| 1 | 13 | HULLMATERIAL | | | CHARACTER | NO |
| 12 | 14 | BODY | | | CHARACTER | NO |
| 1 | 15 | AXELS | | | CHARACTER | NO |
| 5 | 16 | WEIGHT | | | CHARACTER | NO |
| 1 | 17 | POSER | | | CHARACTER | NO |
| 1 | 18 | PROPELLERS | | | CHARACTER | NO |
| 3 | 19 | VESSELFEET | | | CHARACTER | NO |
| 2 | 20 | VESSELINCHES | | | CHARACTER | NO |
| 2 | 21 | ASTYEAR | | | CHARACTER | NO |
| 2 | 22 | VLFCLASS | | | CHARACTER | NO |
| 1 | 23 | VLFCODE | | | CHARACTER | NO |
| 1 | 24 | HISTCODE | | | CHARACTER | NO |
| 9 | 25 | ODOMETER | | | CHARACTER | NO |
| 8 | 26 | ODOMETERDATE | | | CHARACTER | NO |
| 8 | 27 | PRIROD | | | CHARACTER | NO |
| 1 | 28 | MILKEKILO | | | CHARACTER | NO |
| 1 | 29 | BRAND | | | CHARACTER | NO |
| 30 | 30 | ENGINE | | | CHARACTER | NO |
| 10 | 31 | EQUIPMENT | | | CHARACTER | NO |
| 8 | 32 | LICENSECHANG. | | | DATE | NO |
| 1 | 33 | RQD227 | | | LOGICAL | NO |
| 8 | 34 | PRINTED227 | | | DATE | NO |
| 2 | 35 | ARCODE | | | CHARACTER | NO |
| 8 | 36 | ARDATE | | | DATE | NO |

FIG. 4

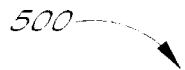

| WIDTH | FIELD DEC | FIELD NAME | INDEX | COLLATE | TYPE | NULLS |
|---|---|---|---|---|---|---|
| 10 | 1 | IDCODE | ASC | MACHINE | CHARACTER | NO |
| 8 | 2 | TITLEDATE | | | DATE | NO |
| 8 | 3 | LIENDATE | | | DATE | NO |
| 30 | 4 | LIEN1 | | | CHARACTER | NO |
| 30 | 5 | LIEN2 | | | CHARACTER | NO |
| 30 | 6 | LIEN3 | | | CHARACTER | NO |
| 30 | 7 | LIEN4 | | | CHARACTER | NO |
| 30 | 8 | LCITY | | | CHARACTER | NO |
| 2 | 9 | LSTATE | | | CHARACTER | NO |
| 10 | 10 | LZIP | | | CHARACTER | NO |
| 1 | 11 | NAMES | | | NUMERIC | NO |
| 26 | 12 | TRANSNUMBER | | | CHARACTER | NO |
| 30 | 13 | OWNER1 | | | CHARACTER | NO |
| 40 | 14 | OWNER2 | | | CHARACTER | NO |
| 35 | 15 | OADDRESS | | | CHARACTER | NO |
| 20 | 16 | OCITY | | | CHARACTER | NO |
| 2 | 17 | OSTATE | | | CHARACTER | NO |
| 10 | 18 | OZIP | | | CHARACTER | NO |
| 2 | 19 | OCOUNTRY | | | CHARACTER | NO |
| 1 | 20 | MAILFLAG | | | CHARACTER | NO |
| 1 | 21 | EMERGENCY | | | LOGICAL | NO |
| 3 | 22 | SERVICENTE.. | | | CHARACTER | NO |
| 10 | 1 | IDCODE | | | CHARACTER | NO |
| 1 | 2 | RECCODE | | | CHARACTER | NO |
| 12 | 3 | BODY | | | CHARACTER | NO |
| 1 | 4 | POWER | | | CHARACTER | NO |
| 30 | 5 | LIEN1 | | | CHARACTER | NO |
| 30 | 6 | LIEN2 | | | CHARACTER | NO |
| 30 | 7 | LIEN3 | | | CHARACTER | NO |
| 30 | 8 | LIEN4 | | | CHARACTER | NO |
| 30 | 9 | LCITY | | | CHARACTER | NO |
| 2 | 10 | LSTATE | | | CHARACTER | NO |
| 10 | 11 | LZIP | | | NUMERIC | NO |
| 3 | 12 | USECLASS | | | CHARACTER | NO |
| 1 | 13 | NAMES | | | NUMERIC | NO |
| 2 | 14 | OCOUNTY | | | CHARACTER | NO |
| 2 | 15 | LCOUNTY | | | CHARACTER | NO |

FIG. 5

| WIDTH | FIELD | FIELD NAME DEC | INDEX | COLLATE | TYPE | NULLS |
|---|---|---|---|---|---|---|
| 10 | 1 | IDCODE | ASC | MACHINE | CHARACTER | NO |
| 2 | 2 | STATE | ASC | MACHINE | DATE | NO |
| 16 | 3 | LIENID | | | DATE | NO |
| 30 | 4 | VIN | ASC | MACHINE | CHARACTER | NO |
| 6 | 5 | SEQUENCE | ASC | MACHINE | CHARACTER | NO |
| 2 | 6 | STATUS | ASC | MACHINE | CHARACTER | NO |
| 30 | 7 | BORROWER | ASC | MACHINE | CHARACTER | NO |
| 10 | 8 | TITLE | | | CHARACTER | NO |
| 10 | 9 | LICENSE | ASC | MACHINE | CHARACTER | NO |
| 30 | 10 | OWNER1 | ASC | MACHINE | CHARACTER | NO |
| 30 | 11 | OWNER2 | ASC | MACHINE | NUMERIC | NO |
| 30 | 12 | OWNER3 | | | CHARACTER | NO |
| 30 | 13 | OWNER4 | | | CHARACTER | NO |
| 30 | 14 | OWNER5 | | | CHARACTER | NO |
| 30 | 15 | OWNER6 | | | CHARACTER | NO |
| 30 | 16 | OCITY | | | CHARACTER | NO |
| 10 | 17 | OZIP | | | CHARACTER | NO |
| 2 | 18 | OCOUNTY | | | CHARACTER | NO |
| 2 | 19 | OSTATE | | | CHARACTER | NO |
| 25 | 20 | ACCOUNT | ASC | MACHINE | CHARACTER | NO |
| 25 | 21 | LOAN | ASC | MACHINE | LOGICAL | NO |
| 2 | 22 | LOANSUFFIX | | | CHARACTER | NO |
| 5 | 23 | BRANCH | ASC | MACHINE | CHARACTER | NO |
| 4 | 24 | YEAR | | | CHARACTER | NO |
| 12 | 25 | MAKE | | | CHARACTER | NO |
| 8 | 26 | TRANSNUMBER | | | CHARACTER | NO |
| 8 | 27 | TRANSCODE | | | CHARACTER | NO |
| 8 | 28 | TRANSDATE | ASC | MACHINE | DATE | NO |
| 8 | 29 | FINANCEDATE | | | DATE | NO |
| 8 | 30 | DMVWORKDATE | | | DATE | NO |
| 8 | 31 | IMPORTDATE | | | DATE | NO |
| 8 | 32 | ADDDATE | | | DATE | NO |
| 8 | 33 | DMVRESPONSED... | | | DATE | NO |
| 5 | 34 | DMVRESPONSEC... | | | CHARACTER | NO |
| 8 | 35 | UPDATED | | | DATE TIME | NO |
| 8 | 36 | PERFECTDATE | | | DATE | NO |
| 8 | 37 | EXPORTDATE | | | DATE | NO |
| 8 | 38 | DMVRECDATE | | | DATE | NO |
| 8 | 39 | DMVDELDATE | | | DATE | NO |
| 8 | 40 | REPAIRDATE | | | DATE | NO |
| 8 | 41 | PAYOFFDATE | | | DATE | NO |
| 10 | 42 | ERRORS | | | CHARACTER | NO |
| 2 | 43 | CLASSIFICATI... | | | CHARACTER | NO |
| 4 | 44 | NOTES | | | MEMO | NO |
| 4 | 45 | STATUSNOTES | | | MEMO | NO |
| 5 | 46 | FINANCETECH | | | CHARACTER | NO |
| 5 | 47 | INPUTTECH | | | CHARACTER | NO |
| 5 | 48 | PAYOFFTECH | | | CHARACTER | NO |
| 5 | 49 | UPDATETECH | | | CHARACTER | NO |
| 1 | 50 | PAPER | | | LOGICAL | NO |

| | RECORD LAYOUT | | | | |
|---|---|---|---|---|---|
| STATE OF CALIFORNIA<br>DEPARTMENT OF MOTOR VEHICLES | PROGRAM ID:<br>REVISION DATE:<br>PAGE: | | | | BY: |
| FILE NAME :<br>DESCRIPTION : LIENHOLDER (L.H.) PAPERLESS TITLE FORMAT (C10P) | | | | | |
| LEGEND :<br>FORMAT :<br>FR=FIXED REQUIRED    VR=VRBL REQUIRED<br>FO=FIXED OPTIONAL    VO=VRBL OPTIONAL<br>IS=INDEXED SEPERATOR<br>FI=FIELD IDENTIFIER | CLASS OF DATA:<br>A=ALPHA    AN=ALPHA NUMERIC<br>S=SPACE    SC=SPEC CHARACTERS<br>B=BINARY    P=PACKED DECIMAL<br>Z=ZONED NUMERIC (DISPLAY) | | | | |
| REMARKS: | | | | | |
| FILE LOCATION: MW. DMVA. RCLAYOUT (C10P) | | | | | |
| FLD# | FIELD DESCRIPTION | NO. OF OCCUR | FORMAT | CLASS | MAX # BYTES |
| 1 | TRANSACTION CODE = C10 | 1 | FR | AN | 3 |
| 2 | OFFICE ID | 1 | FR | AN | 3 |
| 3 | OFFICE WORK DATE (YYMMDD) | 1 | FR | Z | 6 |
| 4 | OFFICE TECHNICIAN | 1 | FR | AN | 2 |
| 5 | OFFICE SEQUENCE NUMBER | 1 | FR | Z | 4 |
| 6 | TYPE TRANSACTION CODE | 1 | FR | AN | 3 |
| 7 | TYPE LICENSE | 1 | FR | AN | 2 |
| 8 | LICENSE NUMBER | 1 | FR | AN | 7 |
| 9 | VEHICLE OR VESSEL ID# (VIN OR HIN) | 1 | VR | AN | 30 |
| 10 | VLF CLASS | 1 | FR | AN | 2 |
| 11 | EXPIRATION DATE (YYMMDD) | 1 | FR | Z | 6 |
| 12 | YEAR FIRST SOLD | 1 | FR | Z | 2 |
| 14 | BODY OR HULL TYPE | 1 | FO | AN | 1 |
| 15 | BODY TYPE MODEL | 1 | VR | AN | 12 |
| 16 | MAKE OR BUILDER | 1 | VR | AN | 12 |
| 17 | AXLES | 1 | FO | Z | 1 |
| 18 | UNLADEN WEIGHT | 1 | FO | Z | 5 |
| 19 | MOTIVE POWER OR VESSEL FUEL CODE | 1 | FO | AN | 1 |
| 20 | HULL MATERIAL (VESSEL) | 1 | FO | AN | 1 |
| 21 | PROPULSIONN (VESSEL) | 1 | FO | AN | 1 |
| 22 | VESSEL LENGTH (FEET) | 1 | FO | Z | 3 |
| 23 | VESSEL LENGTH (INCHES) | 1 | FO | Z | 2 |
| 24 | ASTERISK YEAR OR VESSEL YEAR BUILT | 1 | FO | Z | 2 |
| 25 | VLF EXEMPTION CODE<br>R--IND=INDIAN RESERVATION<br>M-NRM=NON-RESIDENT MILITARY<br>F-STV=SPECIAL TRANSPORTATION | 1 | FO | AN | 1 |
| 26 | PRIOR HISTORY CODE<br>1=PRIOR JUNK (SALVAGED)<br>2=PRIOR SALVAGE (SALVAGED)<br>3=SALVAGE RETENTION<br>4=PRIOR TAXI<br>5=PRIOR POLICE<br>6=ORIGONAL TAXI<br>7=ORIGONAL POLICE<br>8=REMANUFACTURED VEHICLE<br>9=GREY MARKET<br>A=WARRANTY RETURN | 1 | FO | AN | 1 |

*FIG. 7A*

| | | RECORD LAYOUT | | | |
|---|---|---|---|---|---|
| STATE OF CALIFORNIA DEPARTMENT OF MOTOR VEHICLES | | PROGRAM ID: REVISION DATE: PAGE: | | | BY: |
| FLD# | FIELD DESCRIPTION | NO. OF OCCUR | FORMAT | CLASS | MAX # BYTES |
| 27 | ENGINE NUMBER | 1 | VO | AN | 30 |
| 28 | ODOMETER DATE (YYMMDD) | 1 | FO | Z | 6 |
| 30 | EQUIPMENT NUMBER | 1 | VO | AN | 10 |
| 31 | REGISTERED OWNER FIRST LINE NAME | 1 | VR | AN | |
| 32 | REG. OWNER 2ND LINE NAME OR ADDRESES | 1 | VR | AN | 30 |
| 33 | REG. OWNER 3RD LINE NAME OR ADDRESES | 1 | VO | AN | 30 |
| 34 | REG. OWNER 4TH LINE NAME OR ADDRESES | 1 | VO | AN | 30 |
| 35 | REG. OWNER 5TH LINE NAME OR ADDRESES | 1 | VO | AN | 30 |
| 36 | REG. OWNER CITY OR STATE | 1 | VR | AN | 30 |
| 37 | REG. OWNER ZIP CODE | 1 | VR | Z | 9 |
| 38 | REG. OWNER COUNTRY CODE | 1 | FR | Z | 2 |
| 39 | LIENHOLDER 1ST LINE NAME | 1 | VR | AN | 30 |
| 40 | LIENHOLDER 2ND LINE NAME OR ADDRESES | 1 | VR | AN | 30 |
| 41 | LIENHOLDER 3RD LINE NAME OR ADDRESES | 1 | VO | AN | 30 |
| 42 | LIENHOLDER 4TH LINE ADDRESS | 1 | VO | AN | 30 |
| 43 | LIENHOLDER CITY OR STATE | 1 | VR | AN | 30 |
| 44 | LIENHOLDER ZIP CODE | 1 | VO | Z | 9 |

FIG. 7B

| BLOCK ID | BLOCK NAME | DMV REQUIRED DATA ELEMENTS |
|---|---|---|
| 00/0 | NETWORK CONTROL BLOCK | ALL ELEMENTS |
| 02/3 | MESSAGE EXCHANGE BLOCK | ALL ELEMENTS |
| 06/2 | VEHICLE IDENTIFICATION BLOCK | VEHICLE ID NUMBER<br>VEHICLE MAKE<br>VEHICLE MODEL YEAR |
| 26/2 | TITLE IDENTIFICATION BLOCK | TITLE NUMBER<br>TITLE ISSUE DATE |
| 30/1 | LIEN DATA BLOCK | LIENHOLDER ID NUMBER<br>DATE OF LIEN |
| 30/2 | LIENHOLDER NAME BLOCK | LIENHOLDER NAME |
| 30/3 | LIENHOLDER ADDRESS BLOCK | LIENHOLDER ADDRESS |
| 34/1 | OWNER NAME BLOCK | OWNER NAME |
| 34/2 | OWNER MAILING ADDRESS BLOCK | OWNER ADDRESS |

FIG. 8

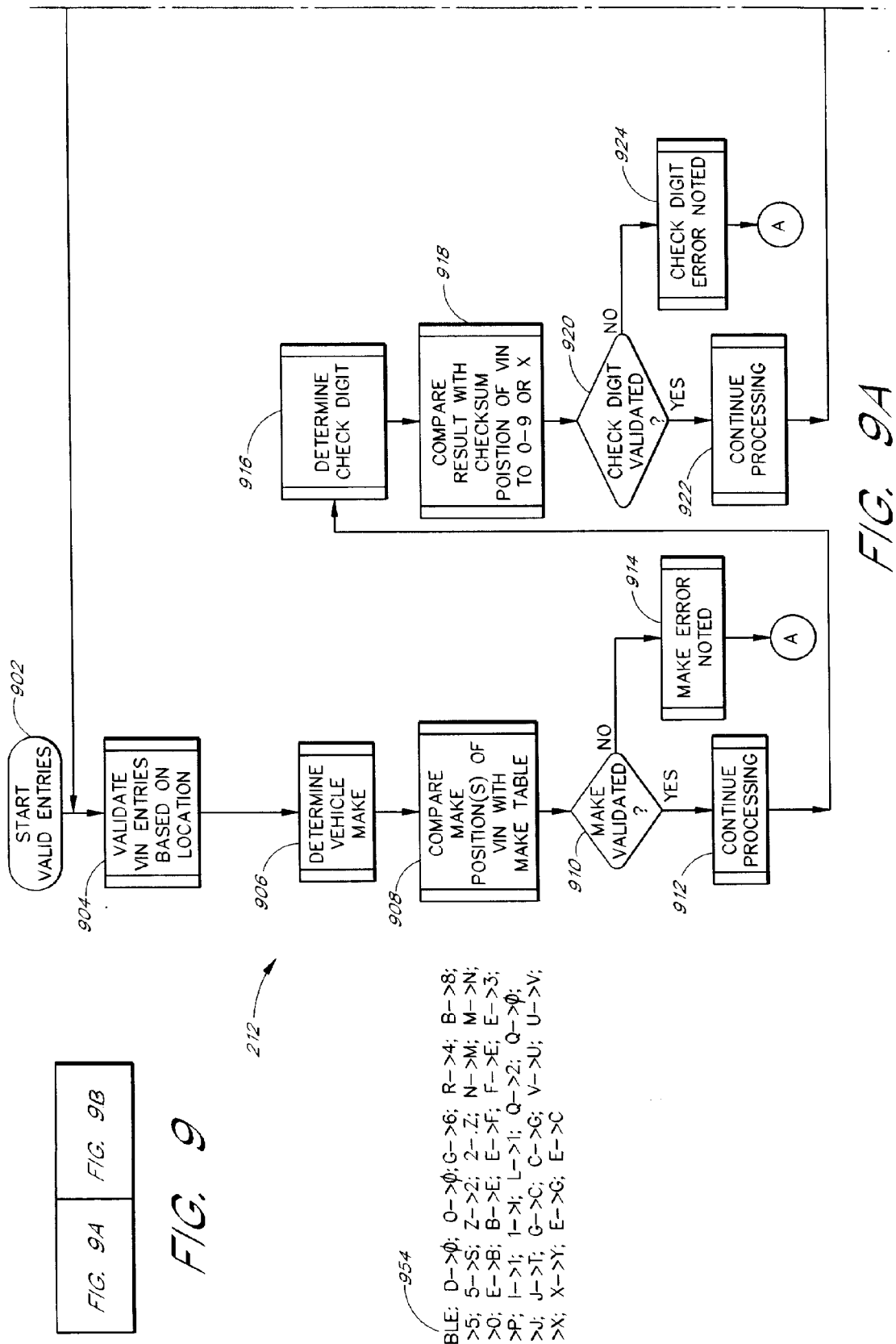

Manager's Summary Items

Summary | Details

| Seq | Item Type | State | Description | Condition | Search Comm |
|-----|-----------|-------|-------------|-----------|-------------|
| 010 | FILE | | DMV update file(s) | FILE(ALLTRIM(Config. M | |
| 020 | FILE | | New Purchase file | FILE(ALLTRIM(Config. A | |
| 030 | FILE | | Automatic Release | FILE(ALLTRIM(Config. A | |
| 040 | FILTER | | New purchase error | Status = "NE" | FORM PTSnpe |
| 050 | FILTER | | Automatic Release | !deleted() | FORM PTSARE |
| 060 | FILTER | | Title(s) requiring | Status = "PL" | FORM PTSear |
| 071 | FILTER | | Loan(s) over 45 | Status = "PM" AND Fin | FORM PTSear |
| 072 | FILTER | | Loan(s) over 60 | Status = "PM" AND Fin | FORM PTSear |
| 073 | FILTER | | Loan(s) over 90 | Status = "PD" AND Tra | FORM PTSear |
| 100 | FILTER | | Electronic release | Status = "RE" AND Tra | FORM PTSear |
| 110 | FILTER | | Title(s) marked | IdCode IN (SELECT IdC | FORM PTSear |
| 120 | FILTER | CA | 227 Required | | FORM PTSear |
| 121 | FILTER | CA | Title(s) with out | Status = "PD" AND DMVre | FORM PTSear |

Save | Undo | Add | Delete | Close

SYSTEM AND METHODS FOR VEHICLE IDENTIFICATION NUMBER VALIDATION

FIELD OF THE INVENTION

The present invention is a method and system for validating vehicle identification numbers and in particular a system and method for inspecting and correcting vehicle identification numbers.

DESCRIPTION OF THE RELATED ART

The tracking of vehicle titles, including liens and other financial interest in those titles, is an essential function of today's economy. Historically, paper vehicle titles have been used to track vehicle ownership and vehicle lien holders. However, paper vehicle titles have presented lien holders with several challenges. These challenges include tracking title status, lost collateral (actual paper titles), and quality control. Prior electronic vehicle tracking systems such as the vehicle title tracking system (VTTS) produced by FDI Consulting Version 4, have addressed these challenges by providing an electronic paperless method of tracking titles and financial interests in those titles. The VTTS provides easier access to the vehicle title record and lowers collateral losses due to less paper. Furthermore, the VTTS provides increased accuracy of title records, and more efficient interaction with the government agency responsible for the issuance of titles (hereinafter, "the Department of Motor Vehicles"). This increased efficiency has resulted in lower Department of Motor Vehicle fees and allows users to access vehicle title records anytime. Thus, VTTS increases title department efficiency and effectiveness and improves customer service levels. Since information is transferred electronically, there is less delay due to "lost" phone calls or use of incorrect forms.

In the VTTS, the vehicle title information is an electronic record rather than an actual paper title. Vehicle title information is confirmed electronically instead of on paper forms. The FDI VTTS provides electronic transfer, search, and storage of vehicle title records. The VTTS stores vehicle information from both the lien holder and the Department of Motor Vehicles. The VTTS can match information from the lien holder and the DMV records to compile a perfected vehicle title record. The vehicle identification number (VIN), a unique number assigned to every vehicle manufactured for sale in the United States, appears in both the DMV and the lien holder records, and therefore has been used as a "key" in matching DMV records with corresponding lien holder records.

However, the prior VTTSs have several disadvantages. One significant limitation of conventional systems is that a system had to be optimized on a state-by-state basis. This is because each state has its own file format and its own unique database format. Thus, VTTSs would have to be uniquely coded for each database format used by the 50 states. Alternatively, each state would have to agree to use a common format. However, because each state has unique needs, such agreement has not occurred.

Furthermore, when the VIN provided by the DMV fails to match the number provided by lien holder, the prior systems only perform rudimentary error detection and correction on the unmatched VIN number. For example, conventional systems were limited to interchanging a letter, such as an I or an O with a corresponding number, having an almost identical appearance, such as a 1 or a 0. Typically, no attempt is made to substitute one letter with another letter. Because only rudimentary attempts are made to correct an unmatched VIN, the VIN is frequently not successfully corrected by existing VTTSs. Thus, manual intervention by an operator is required to correct an unmatched VIN.

SUMMARY OF THE PREFERRED EMBODIMENT

The present invention provides novel systems and methods for the automated inspection and correction of Vehicle Identification Numbers (VIN). VIN numbers are often misentered by data entry personnel, causing significant problems in tracking the related vehicle title, and updating title information. The present invention allows an accurate detection of misentered VINs as well as the correction of the same. The need for human intervention in correcting VINs is thereby greatly reduced. Thus, one embodiment of the present invention inspects the different VIN fields or positions to detect data entry or transmission errors. If the VIN contains an illegal or incorrect character at a given position, one or more characters are replaced with alternate or substitute characters. In one embodiment, the VIN is then reinspected to determine if the VIN is now correct.

Thus, in one embodiment, a VIN's vehicle make code and year code are inspected to ensure that the codes are valid. Thus, by way of example, the make code may be compared against valid make codes. If the make code is not a valid make code, at least one character of the VIN make code is replaced with a likely substitute character. Similar operations may be performed for other invalid VIN codes.

BRIEF DESCRIPTION OF THE DRAWINGS

FIG. 4 illustrates the data structures of a supplementary, state-specific VTTS table for a first state in accordance with one embodiment of the present invention;

FIG. 5 illustrates the data structures of a supplementary, state-specific VTTS table for a second state in accordance with one embodiment of the present invention;

FIG. 6 illustrates the data structures stored of a VTTS common table, the common table having fields common to multiple states, in accordance with one embodiment of the present invention;

FIG. 7A, 7B illustrates data structures stored in a vehicle tracking database of a first state;

FIG. 8 illustrates data structures stored in a vehicle tracking database of a second state;

FIGS. 9A, 9B illustrate a detailed flow chart of one embodiment of the VIN error detection and correction process;

FIG. 12 illustrates one embodiment of a Summary Items form for the manager's summary report;

FIG. 14 illustrates one embodiment of a search form.

DETAILED DESCRIPTION OF THE PREFERRED EMBODIMENTS

The present invention provides methods and systems for tracking vehicle titles from more than one state. One core vehicle title tracking apparatus advantageously tracks the titles of vehicles from multiple states. Thus, one embodiment of the present invention obviates the need to have a unique vehicle title tracking system (VTTS) for each state or the need to have each state use the same database format. The term "state" is generally used herein to include at least state agencies involved in the vehicle title recordation or issuance process, as well as non-governmental entities performing similar or related services.

VTTSs generally handle the receipt, processing, monitoring and maintenance of electronic or paper title and lien documents. Often, when a consumer acquires a vehicle, such as a car, the vehicle may be financed or leased. Thus, the financial institution providing the financing has a financial interest in the leased or financed vehicle. In order to provide notice of a financing institution's interest in the vehicle, the name of the financing institution is placed on the vehicle title. The title either lists the institution as the vehicle owner or showing that the institution has a lien on the vehicle. The VTTS provides an electronic paperless method of tracking titles and financial interests in those titles. Financial institutions that utilize the VTTS are also called "clients."

Figure 1:
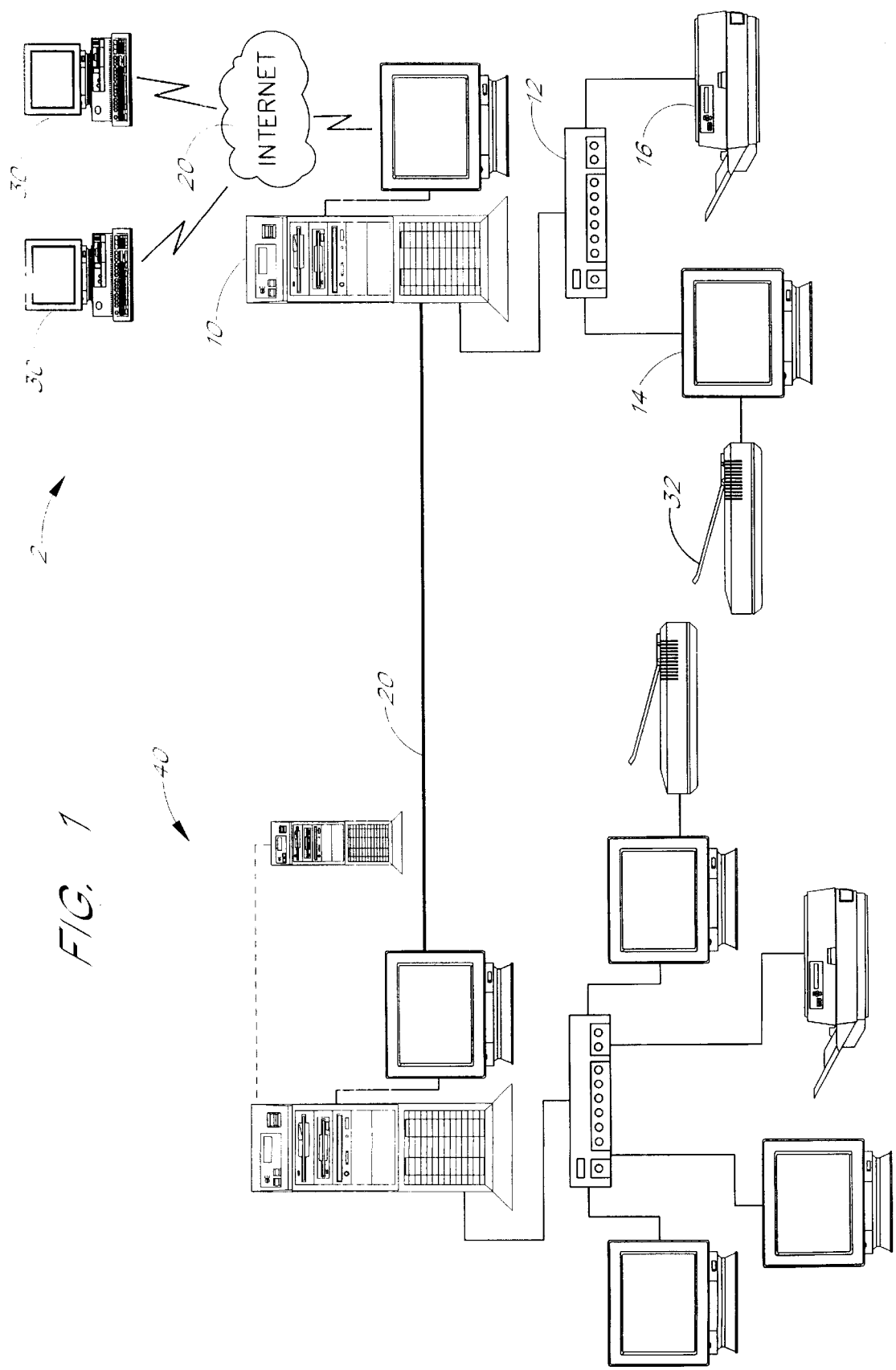
FIG. 1 is a high level block diagram illustrating the architecture of an automated vehicle title tracking system (VTTS) adapted to implement a preferred embodiment of the present invention.

FIG. 1 is a high level block diagram illustrating an architecture of an on-line automated vehicle title tracking system 2 adapted to implement a preferred embodiment of the present invention. The on-line VTTS includes a VTTS file server 10 executing VTTS host software, a hub 12 connecting the file server 10 to a workstation 14 and a printer 16. A scanner 32 may be connected to the workstation 14. Operators may use the workstation 14 to enter data into the VTTS 2 and to maintain the VTTS 2. The scanner 32 may be used to scan in paper titles or other documents so that they may be electronically stored in the VTTS 2. The printer 16 may be used to print VTTS reports, VTTS code listings and other information. Client browsers or the like executing on client systems 30, as described below may access data stored on the file server 10. The client systems 30 may be coupled to the file server 10 via one or more communication mediums 20. The communication medium 20 may be part of a wide area network (WAN) such as the Internet or a value added network, such as Advantis® or AAMVAnet®. Alternatively, the communication medium 20 may be a dedicated connection between the client system 30 and the file server 10.

Focusing now on one preferred embodiment of the VTTS 2, the file server 10 may be a general-purpose computer, such as an Intel® Pentium II-based system. The file server 10 typically includes a display, random access memory (RAM), and mass storage devices (not shown) such as hard drives, CD-ROMs, tape drives, and digital versatile disks (DVD). The mass storage devices typically contain VTTS software, VTTS databases, and an operating system. The VTTS software includes instructions and data. In one preferred embodiment, the VTTS runs the Microsoft® NT operating system. However, the choice of operating systems is not critical and may, for example include Unix or IBM® OS/2® operating systems. As is conventional for those VTTSs that use the Internet as a communication medium, the preferred operating system includes a TCP/IP stack that handles all incoming and outgoing message traffic passed over the communications medium 20.

Focusing now on a preferred embodiment of the client systems 30, a client system 30 may be a general-purpose computer running an Internet browser. In one preferred embodiment, the client systems 30 are conventional personal computers equipped with a modem and running an appropriate operating system. The choice of operating systems is not critical, and may include Microsoft® Windows 95, Microsoft® Windows® NT, the Apple® MacOS®, Unix, or IBM® OS/2® operating systems. As is conventional for those systems that use the Internet as a communication medium, the preferred operating system includes a TCP/IP stack that handles all incoming and outgoing message traffic passed over the communications medium 20.

In other embodiments, the client system 30 could include, for example, a computer workstation, a local area network of computers, an interactive television, a personal digital assistant or the like which can interact with the communication medium 20. While in such systems, the operating systems will differ, they will preferably continue to provide the appropriate communications protocols needed to establish communication links with the communication medium 20.

In the preferred embodiment, the client browser is a software program that allows a client to access the VTTS 2 over the communication medium 20. The client browser may be the Microsoft® Internet Explorer developed by Microsoft Corporation or Internet browsers such as the Netscape® Navigator developed by Netscape, Inc. One of ordinary skill in the art, however, will recognize that numerous other types of access software could also be used to implement the present invention. These other types of access software could, for example, be other types of Internet browsers or other types of client applications including custom network browsers, two-way communications software, cable modem software, point-to-point software and the like.

The operation of a preferred embodiment of the VTTS server 10 will now be described. After start-up, the VTTS server 10 executes the VTTS software. A preferred embodiment of the VTTS software includes a number of modules, including translation modules and a VIN validation module, as described below. The VTTS server receives client requests, including a Uniform Resource Locator (URL). A URL is a unique address that specifies the location of a file or other resource on the Internet. The VTTS reads a source file defined by the URL and performs the page generation needed to complete the request.

In a preferred embodiment, the VTTS server's mass storage stores a variety of HTML structures, including, by way of example, search forms, information export and import forms, and report forms. The term "form," as used herein, includes, but is not limited to a displayed form, a digital representation of a form, and, code, such as HTML, used to generate or cause the generation of a form. In a preferred embodiment, the VTTS mass storage also stores one or more databases relating to the vehicle titles being tracked. In one embodiment, the databases are implemented using an Xbase-compatible code. In another embodiment, Structured Query Language (SQL) code may be used. The structured query language is a language standardized by the International Standards Organization (ISO) for defining, updating and querying relational databases. In one preferred embodiment, the databases are implemented using Microsoft's Visual FoxPro®. However, as will be understood by one skilled in the art, the databases can be implemented with any number of commercial database programs including Sybase's relational database products, Microsoft's SQL Server®, Oracle's relational database products and the like.

In a preferred embodiment, vehicle title related information, including Department of Motor Vehicle data and data from the financial interest holder, are stored in a number of tables. These tables include, but are not limited to, a table common to multiple states and state specific tables, as described below.

During a typical session, the client system 30 and the VTTS server 10 communicate with each other over the communication medium 20. The client may use a standard Web browser to access the VTTS server 10, log into the VTTS using a user identification code and password, and to retrieve documents, including forms and reports.

In one embodiment, a second VTTS 40 may be connected to the first VTTS 2 via the communication medium 20. The second VTTS may be located in a different location then the first VTTS 2, such as in another state. The second VTTS may be used as a backup site, as an alternate site, or as a supplementary site.

Figure 2:
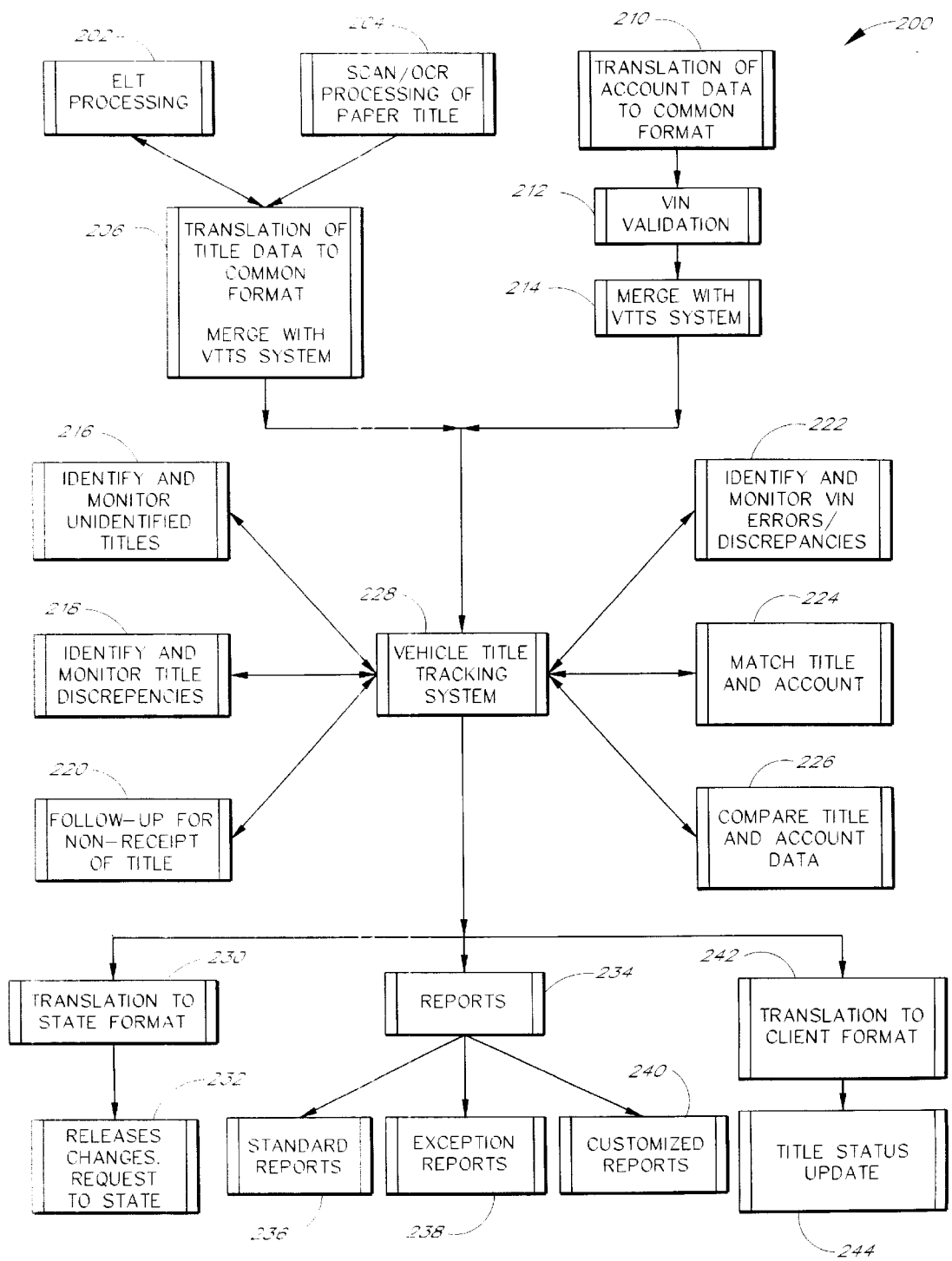
FIG. 2 is a flow chart illustrating the software architecture of one embodiment of the VTTS and related input/output processing.

The software architecture 200 of one embodiment of the VTTS and related input/output processing is illustrated in FIG. 2. The software architecture 200 includes a block 202 wherein electronic lien and title (ELT) information from the DMV is received and processed for later use. The ELT information may be transmitted directly from the client to the VTTS or may be sent to an electronic mailbox for later retrieval by the VTTS. Alternatively, paper titles may be scanned into the system as an image. Optical character recognition (OCR) is performed at a block 204, converting the scanned image into computer readable text. The data received and processed at the blocks 202, 204 is then translated and converted into a common VTTS data format at a block 206 and merged with the VTTS. A preferred embodiment of the translation process is described in greater detail below.

The VTTS also receives data from clients. The client data may already be compatible with the VTTS common format, in which case no translation is necessary. However, if the client data is in a non-compatible format, the client data is translated into the common VTTS data format at a block 210. The client data may include, but is not limited to, new account information, changes to existing accounts, and loan payoff information. Typically, the client data includes a VIN for the vehicle title at issue. The vehicle identification number (VIN) specified by the client is verified at a block 212 to ensure that the VIN complies with the standardized VIN format. Under current standards, the VIN is a unique 17-digit number assigned to every new vehicle manufactured for sale in the United States. For older vehicles, which may have non-unique VIN numbers with less than 17 digits, a new 17 digit VIN number may be generated using a combination of the title number and the original VIN number. The present invention is not, however, limited to a VIN having 17 digits.

The VIN appears in both the DMV and the lien holder records, and therefore the VIN is used as a "key" in matching DMV records with corresponding lien holder records. If the VIN received from the client is in an improper format, or does not correspond to any VIN received from the DMV, then software executing in the VTTS attempts to correct or "repair" the client VIN using an advanced and novel character substitution technique. Typically, the VIN validation procedure is performed for new accounts. However, in another embodiment, the VIN validation procedure may be performed on all accounts. A preferred embodiment of the validation procedure is described in greater detail below. Once the VIN validation is performed, the translated client data is then merged with the VTTS at a block 214. In addition, the corrected VIN may optionally be transmitted back to the client along with the original, incorrect VIN. The client may then use the original, incorrect VIN to find the associated record and replace the original VIN with the corrected VIN.

In one embodiment, the DMV data and the client data from the blocks 206, 214 respectively, are received by a VTTS core 228. The VTTS core 228 performs the following operations on the received data. At a block 222, the VTTS identifies and monitors VIN errors and discrepancies, such as the failure of a client supplied VIN to match with a DMV supplied VIN. At a block 224, the VTTS matches the account information to a title. At a block 226, the VTTS compares data from the account to data in the matched title. At a block 218, the VTTS identifies and monitors and title discrepancies, i.e., those titles where the DMV information does not correspond to the client information. At block a 216, the VTTS identifies and monitors any unidentified titles, i.e., those titles that do not have corresponding DMV and client records. At a block 220, the VTTS identifies any titles which have not been received, and takes appropriate action, such as, by way of example, reporting the lack of receipt. The operations described above are performed by one embodiment of the present invention, but not all of the above operations are required in every embodiment of the present invention. Similarly, additional operations may be added to those described above.

In one embodiment, once the VTTS has performed one or more of the operations of the blocks 216, 218, 220, 222, 224, and 226, the resultant data is then provided for further processing. Thus, in a block 230, the data is translated into a state-specific format as specified by the state DMV. The translated data may include, by way of example, releases and changes to title status, in a block 232. Similarly, in one embodiment, the resultant data from the block 228 is translated into a client data format at a block 242. The title status is updated in a block 244.

In addition, a report generator at a block 234 receives the resultant data from the block 228. The report generator may optionally generate a variety of different report types, including, by way of example, standard reports at a block 236, exception reports at a block 238, and customized reports at a block 240.

Figure 9B:
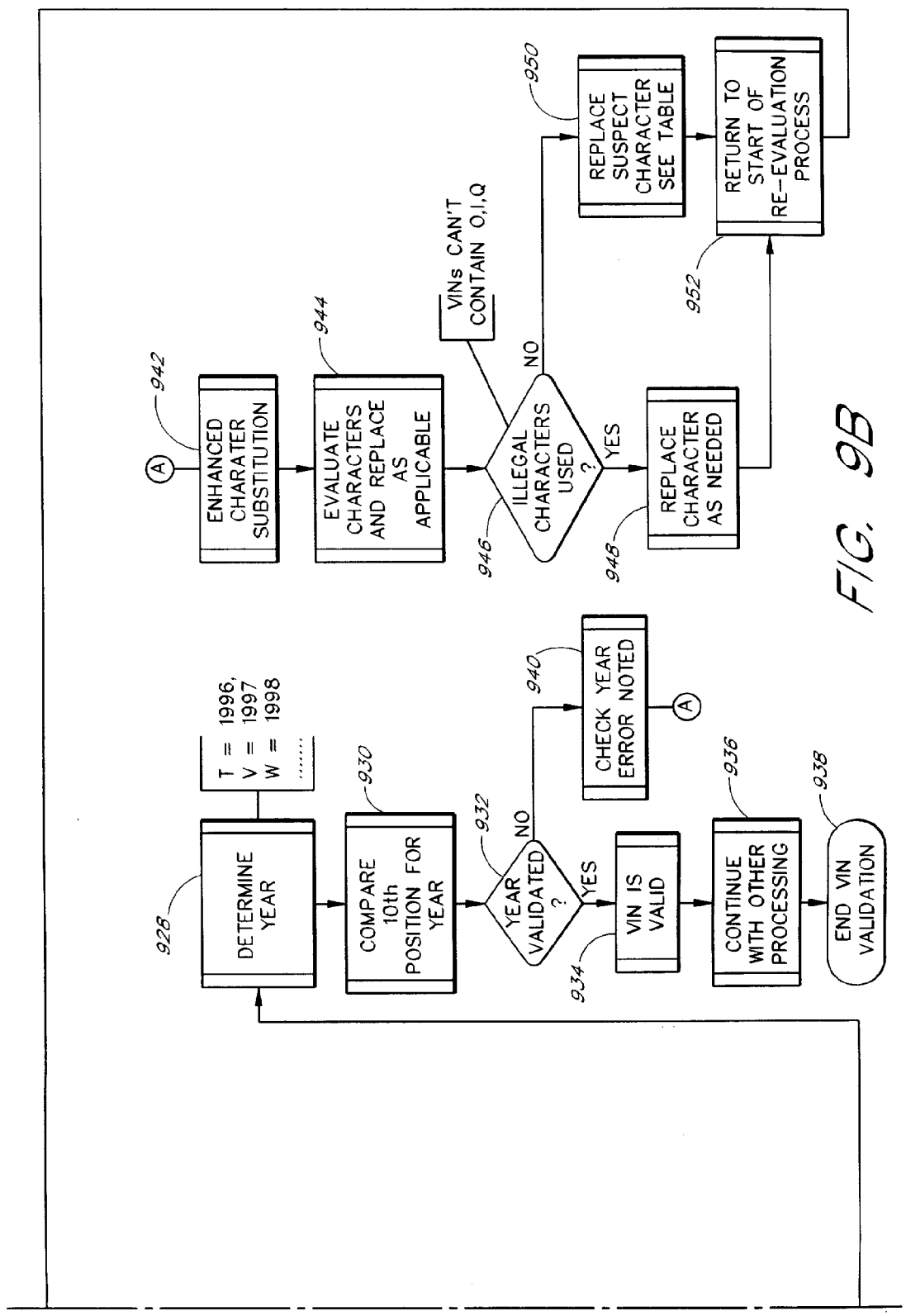

The VIN validation procedure of the block 212 will now be discussed in greater detail. FIG. 9A, 9B illustrate a detailed flow chart of one embodiment of the VIN validation process 212 performed by the VIN validation module. As described below, the validation procedure makes use of the fact that certain positions within the VIN contain data that have significance and can be used to validate the VIN. By way of example, the value at position 1 indicates the country of origin. Thus, a "1" at position 1 indicates that the U.S. is the country of origin, while, a value of "2" indicates Canada is the country of origin. VIN position 2 indicates the vehicle make. The character "H" indicates Honda, the character "G" indicates GMC, etc. Positions 3 through 8 have values that are manufacturer dependent, i.e., there is presently no standard interpretation of the values at positions 3 through 8. Position 9 is a check digit. The check digit is calculated based on the values at other VIN positions. Typically, the values 0–9 and X are the only valid values for position 9. Position 10 indicates the model year. Thus, for example, the character "S" represents 1995, while the character "R" represents 1994. Positions 12–17 typically contain a sequential number corresponding to a vehicle identification code sequentially assigned by the manufacturer.

As illustrated in FIG. 9, from start step 902, the process proceeds to a step 904, which begins the VIN validation process. The VIN validation process examines the values of certain positions within the 17 position VIN. In step 906, a determination of the vehicle make is attempted. At a step 908, the VIN position 2 value, which indicates the vehicle make, is compared against the contents of a Make table. The Make table includes vehicle makes and their corresponding value. Proceeding to a decision step 910, if the comparison indicates that the VIN contains a valid entry, then the process proceeds to a step 912 for further checking of the VIN. Otherwise, the process proceeds to a step 914, where the Make error is noted. The system then proceeds from the step 914 to a step 942, where an enhanced character substitution procedure is performed. The enhanced character substitution procedure is discussed in greater detail below.

Proceeding from the step 912 to a step 916, a check digit at position 9 is compared to at least one value calculated from at least data at one other VIN position using a predetermined algorithm. Proceeding to a decision step 920, if the check digit is validated, the process proceeds to a step 922 so that further checking of the VIN may be performed. Otherwise, the process proceeds to a step 924, where the error in the check digit is noted. The process proceeds from the step 924 to the step 942, where the enhanced character substitution procedure is performed.

Proceeding from the step 922 to a step 928, the contents of the tenth position of the VIN, indicating the vehicle year of manufacture, is determined. At a step 930, the content of the VIN's tenth position is compared against predetermined characters corresponding to years of manufacture. Proceeding to a decision step 932, if the year is validated, the process proceeds to a step 934, indicating that the VIN is valid. The process proceeds from the step 934 to a step 936, where other processing may optionally be performed. Proceeding to a step 938, the VIN validation process is ended. If the year is not validated, the process proceeds to a step 940 which notes that an error occurred in checking the tenth VIN position. The process then proceeds to the step 942, where the enhanced character substitution procedure is performed.

The enhanced substitution procedure, beginning at the step 942, will now be discussed. Proceeding to a step 944, the character identified as being in error is evaluated and corrected by replacing the illegal character with an appropriate substitute character. Thus, proceeding to a decision step 946, the character being checked is evaluated to determine if the character is an illegal character. An illegal character is a character that is not permitted in a valid VIN. In one embodiment, illegal characters include the characters "O," "Q," and "I." In other embodiments, the set of illegal characters may be different. If an illegal character is located, then the process proceeds to a step 948, where character replacement occurs. As shown in table 954 (FIG. 9A), by way of example, an "I" is replaced with a "1," an "O" is replaced with a "0," and a "Q" is replaced with an "0."Once the replacement of the illegal characters has occurred, the process proceeds from the step 948 to a step 952 so that the evaluation process can begin again with the corrected VIN.

If an illegal character is not found at decision step 946, then the process proceeds to a step 950. At the step 950, suspect characters, including, by way of example, numbers or letters, at positions where an error was detected are replaced, one at a time, with likely substitute characters. The likely substitute characters are specified in the table 954. In one embodiment, the likely substitutes are selected based a similarity in appearance between characters. The substitute characters may also be selected based on other criteria, such as the proximity of characters on a QWERTY keyboard or having similar corresponding ASCII binary codes. By way of example, if it had previously been determined that a year error occurred at the step 932, and that the tenth position had an invalid model year character, such as an "X," the table 954 is consulted to find a likely substitute character. Referring to the table 954, a likely substitute for the letter "X" is the letter "Y." Thus, the letter "X" at the tenth VIN position is replaced with the letter "Y" in an attempt to correct the VIN. Proceeding to a step 952, the VIN evaluation process is begun again with the corrected VIN. The validation process described above is repeated until a valid VIN is formed or, alternatively, a predetermined number of corrections have been attempted.

Figure 10A:
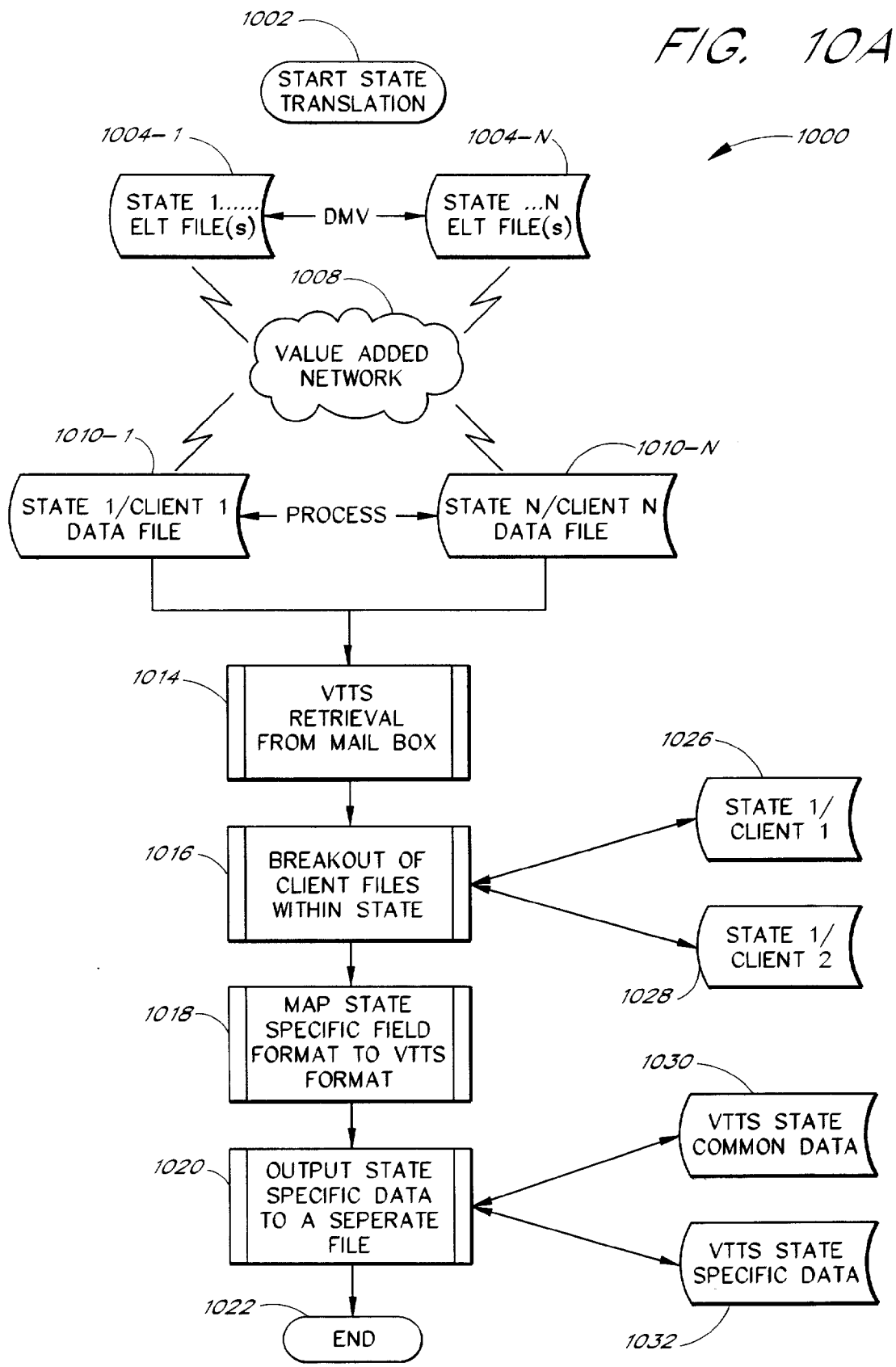
FIGS. 10A, 10B illustrate a detailed flow chart of one embodiment of the translation of data from multiple states to a VTTS common format.
Figure 10B:
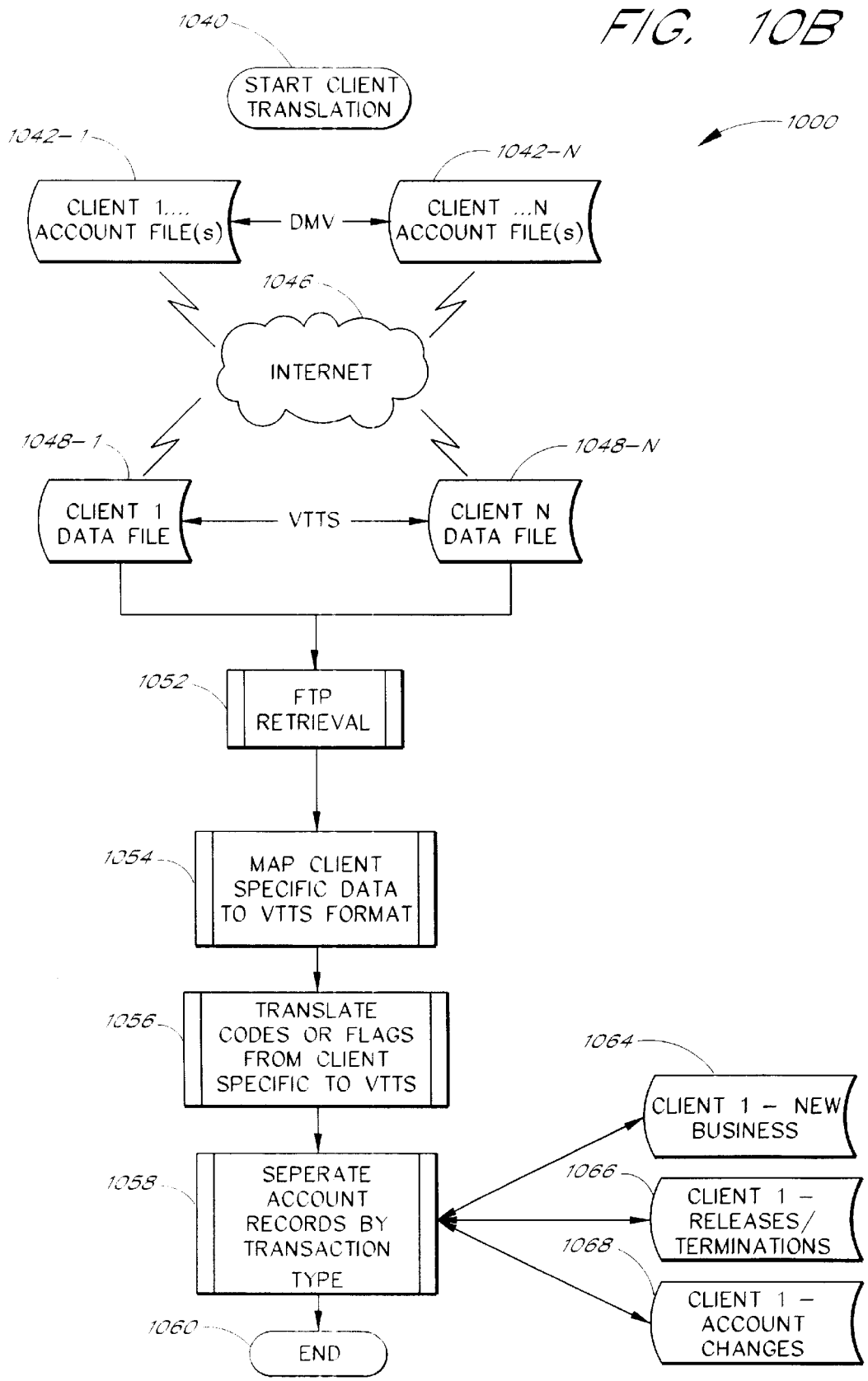

The translation procedures of the blocks 206 and 210 performed by corresponding translation modules will now be discussed in greater detail. FIGS. 10A, 10B illustrate a detailed flow chart 1000 of one embodiment of the translation of data from multiple states and multiple clients to a VTTS common format. The state data translation begins at a stage 1002. Multiple state ELT files, 1004.1–1004.N, such as those illustrated in FIGS. 7A, 7B, and 8, exist in multiple state DMV databases. The ELT files are transferred over a network 1008, such as a value added network, the Internet, or any other type of network, and are received at a receiving site as files 1010.1–1010.N. The received state DMV files 1010.1–1010.N may then be stored in an electronic mailbox. The VTTS retrieves the files from the mailbox at a step 1014. If the state data has not been separated at the state level by the lienholder, then VTTS preprocessing separates the ELT data into separate client files 1026, 1028 at a step 1016.

In step 1018, state specific fields are mapped to a corresponding VTTS field designation. In step 1020, state specific data from each file 1026, 1028 is stored in a corresponding state-specific file 1032. Similarly, state common data from each file 1026, 1028 is stored in a corresponding common data file 1032. Once the common and state specific data is stored in the appropriate files, the process proceeds to an end step 1022, and the translation of the state ELT data files is completed.

The translation of data from multiple clients begins at a stage 1040 (FIG. 10B 0. Multiple client account files, 1042.1–1042.N correspondingly exist in multiple client databases. The account files are transferred over a network 1046, such as the Internet, or any other type of network directly to the VTTS or alternatively, to an electronic mailbox. The files are received as files 1048.1–1048.N. The files may be received using a variety of techniques, such as the Internet file transfer protocol (FTP) at a step 1052.

In step 1054, each client file has state fields that are mapped to a corresponding VTTS field designation. In step 1056, client codes or flags are translated into VTTS compatible codes or flags. For example, a client may transmit a "T1" code to signify a release of a vehicle title to the registered owner. This code is translated to an "RO" which is used by other portions of the VTTS to release the vehicle title to the registered owner.

In one embodiment, at a step 1058, account records are separated by transaction type. The transaction type account records may include, but are not limited to, one or more of the following: new business 1064, releases and terminations 1066, account changes 1068.

Figure 3:
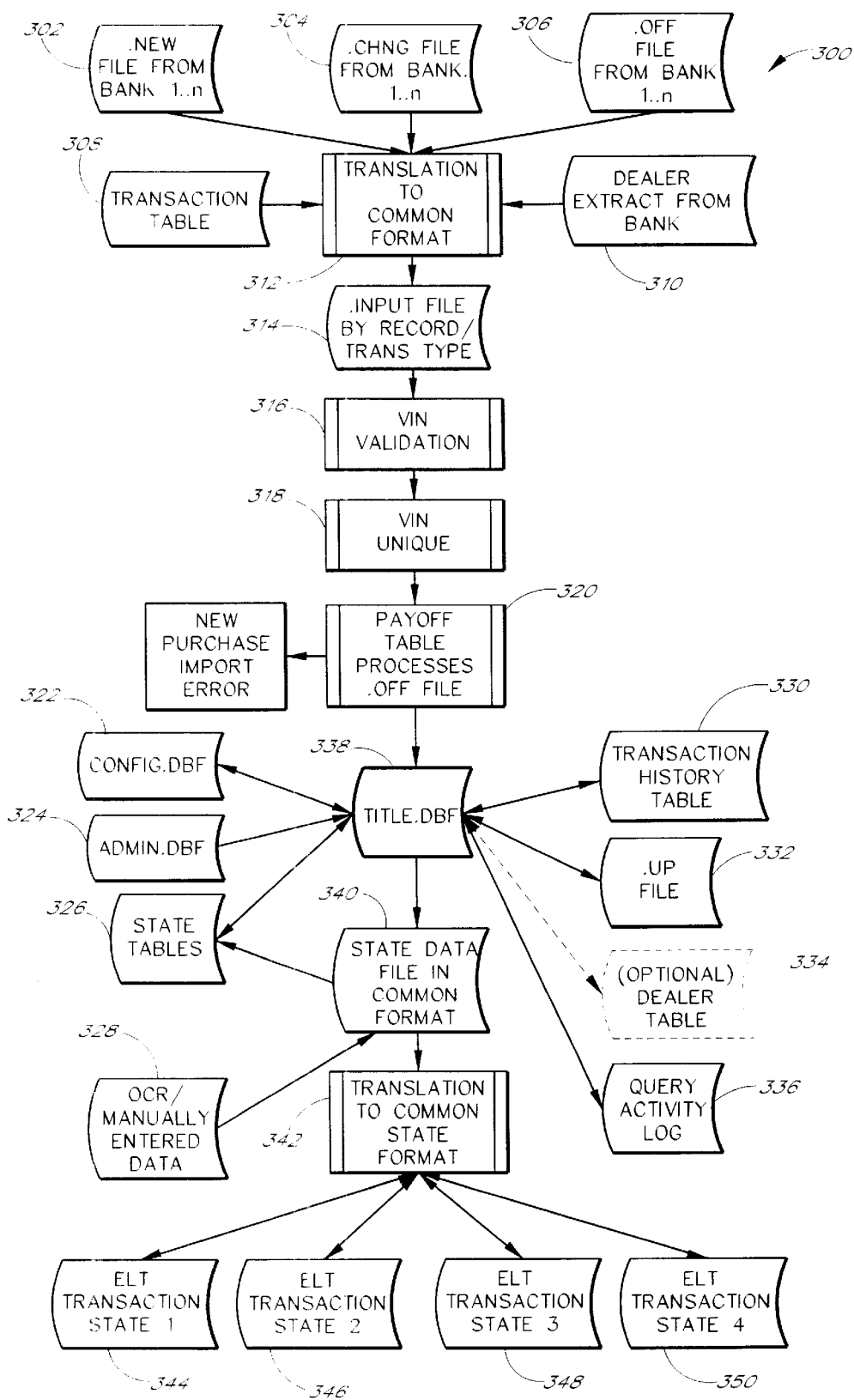
FIG. 3 is a flow chart illustrating the data flow of one embodiment of the VTTS.

A data flow of one embodiment of the VTTS is illustrated in FIG. 3. The VTTS may receive one or more the following transaction data from a financial institution regarding a vehicle: new account data .NEW at a block 302, data changes .CHNG at a block 304, lien release data .OFF at a block 306, and dealer information, including the dealer contact name and phone number, at a block 310. The above data can be received as separate files for each transaction type as illustrated, or alternatively, as one file containing different transaction types. The received data is then translated into a common VTTS data format at a block 312. Additionally, the financial institution may specify a variety of different transaction types and directions for processing at a block 308. The transaction types may include one or more of the following: data changes, substitution of collateral, lease assumption, as well as other transaction types. A transaction table is created which corresponds to information processed at the block 308. The transaction table is then used to control the translation process at the block 312.

The translated data is then entered into a corresponding input file at a state 314. A different file may be used to store each transaction type. In one embodiment, received VIN numbers are validated at a block 316 to check whether they comply with the standard VIN format. As described above, if an error in the VIN number format is detected, then the VTTS will attempt to repair or correct the VIN number. As previously described, in one embodiment, the VIN validation process may be performed only for new account transactions. Alternatively, VIN validation may be performed for all transactions. If a new account file is received, the VIN stored in the new account is compared at a block 318 against existing account file VINs to check whether the new account VIN is a duplicate of an existing account file VIN. This duplication may occur if a client attempts to open the same new account twice. An indicator is set if the VIN is already present so that an error can be reported later.

Payoff information originally received at the block 306 in the OFF file is processed at a block 320.

A title database Title.DBF receives and provides data to a variety of sources at a block 338. The Title.DBF generally stores title-related information from state DMVs and clients. A Config.DBF database identifies a client by a lienholder ID at a block 322. The Config.DBF database permits multiple operating divisions within a client corporation to be uniquely identified. At a block 324, an Admin.DBF database enables different activities to be performed based on a variety of parameters, such as the identity of the state in which the car is registered, or the identity of the client, or the real-time date. Thus, by way of example, if a specific title is not received from the DMV within a predetermined period of time, an operator may be alerted to contact the DMV regarding the title or, alternatively, the VTTS may automatically generate a letter or electronic message to the DMV. Furthermore, an action date may be set which allows a time to elapse for a response from the DMV before any further action is taken by the VTTS regarding the matter.

At a block 326, state-unique tables contain state-specific data. For example, a state table 400 for California, as illustrated in FIG. 4, may contain different information or different data sets then a state table 500 for Virginia, as illustrated in FIG. 5. The California table 400, for example, may have an "ODOMETER" data field, while the Virginia table 500 may have a "MAILFLAG" data field.

In one embodiment, each table 400, 500 has multiple columns and multiple rows. Each row represents a different table field. A "WIDTH" column entry indicates the data width of the associated data. A "FIELD" column entry identifies the field. A "FIELD NAME DEC" column stores a field name descriptor. An "INDEX" column entry indicates if the associated field is indexed, and if so, the indexing order (e.g., ascending—"ASC" or descending). A "COLLATE" column entry indicates which alphabet is to be used when performing the indexing. For example, a "MACHINE" entry indicates that the indexing is to be performed based on order of letters in the English alphabet. Alternatively, the indexing may be performed based on the order of letters in other alphabets, such as the German or the Finnish alphabets. A "TYPE" column entry indicates the associated field data type. For example, the data may be a character-type, a date-type, or a logical-type.

At block 340, state data files which are in the VTTS common data format, or have been translated into the VTTS common data format, are provided to the state tables at block 326 and to the Title.DBF database at the block 338. The translated data comes from one or more state ELT transaction fields at blocks 344, 346, 348, and 350. The common format table contains data fields that are common to a plurality of states. FIG. 6 illustrates one embodiment of data content of a VTTS table 600 common to multiple states. Thus, by way of example, each state typically has a VIN data field, a STATE data field, a BORROWER data field, and a MAKE data field. Thus, one common table structure 600 may be advantageously used to store data types common to multiple states. However, in one embodiment, each state does not have to have corresponding fields for all the VTTS common table fields. As discussed above, a unique state table is used to store state-specific data. The combination of a common format table and state-specific tables permit the VTTS to efficiently track titles from multiple states. Thus, a single VTTS may be used to track title from multiple states, in contrast to prior systems that require a customized VTTS for each state. In other embodiments, other data structures or definitions may be used in addition to or in place of the aforementioned table data structures.

Furthermore, in one embodiment, data is transferred between the Title.DBF and a transaction history table at a block 330, an UP file at a block 332, an optional dealer table at a block 334, and a query activity log at a block 336. The transaction history table keeps track of changes to the title, while the UP file includes data to be provided to the client. The query activity log keeps track of which activities have occurred.

Figure 13:
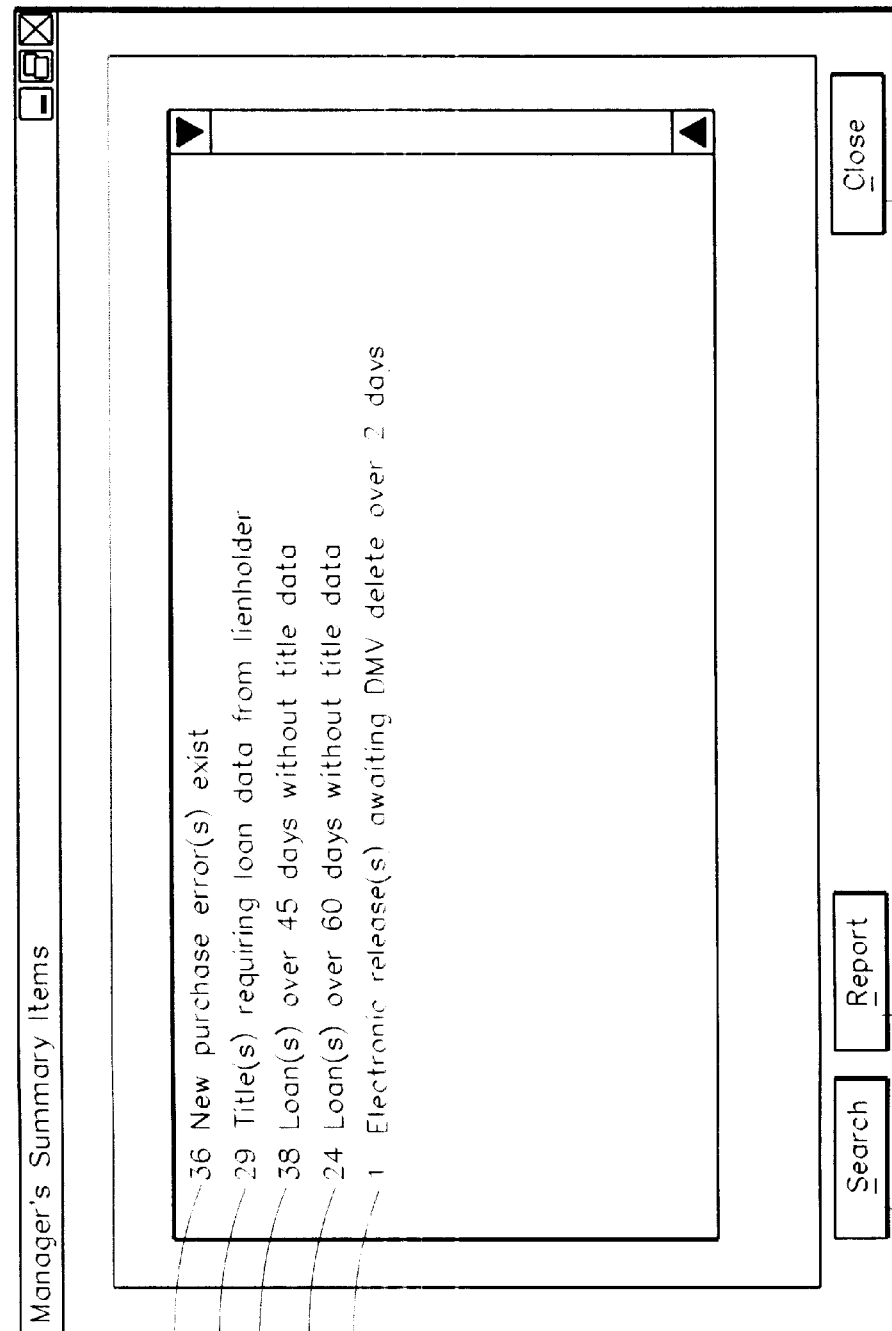
FIG. 13 illustrates one embodiment of the manager's summary report.

As discussed above, one embodiment of the present invention provides a variety of reports to the client or the VTTS operator. In one embodiment, a client may be presented with a status summary on loans and titles, also called a Manager's Summary. An exemplary Manager's Summary Items form 1300 is illustrated in FIG. 13. The form 1300 may be optionally viewed on a terminal, printed out, or saved. In one embodiment, the form is generated using HTML. In another embodiment, the form is created using other languages. The Manager's Summary may include the number of loans or titles whose status fall into predetermined categories. Thus, rather than providing a full report for each item, a manger may obtain a quick overview of current loan and title status. By way of example, the Manager's Summary may provide the client or VTTS operator with the following types of information:

the number of occurrences of an error type (Line Item 1310)

the number of titles requiring loan data from a lienholder (Line Item 1312)

the number of loans older than a specified number of days for which a title has not been received (Line Items 1314, 1316)

the number of electronic releases awaiting DMV acknowledgment for a given period of time (Line Item 1318)

At the bottom of the Manager's Summary Items screen are several "soft" keys or buttons. The soft keys perform a variety of functions. For example, a user may select one of the line items 1310, 1312, 1314, 1315, 1318 displayed by the Manager's Summary 1300 by clicking on the item using a mouse or the like. Actuating a Search key 1320 using a mouse or a keyboard causes a new search to be performed on the selected items using search criteria defined in a Details entry form described below. Similarly, actuating a Report key 1322 generates a full report on the selected items, rather than just the manager' summary. Actuating a Close key 1324 causes the Manager's Summary Items form to close.

Figure 11:
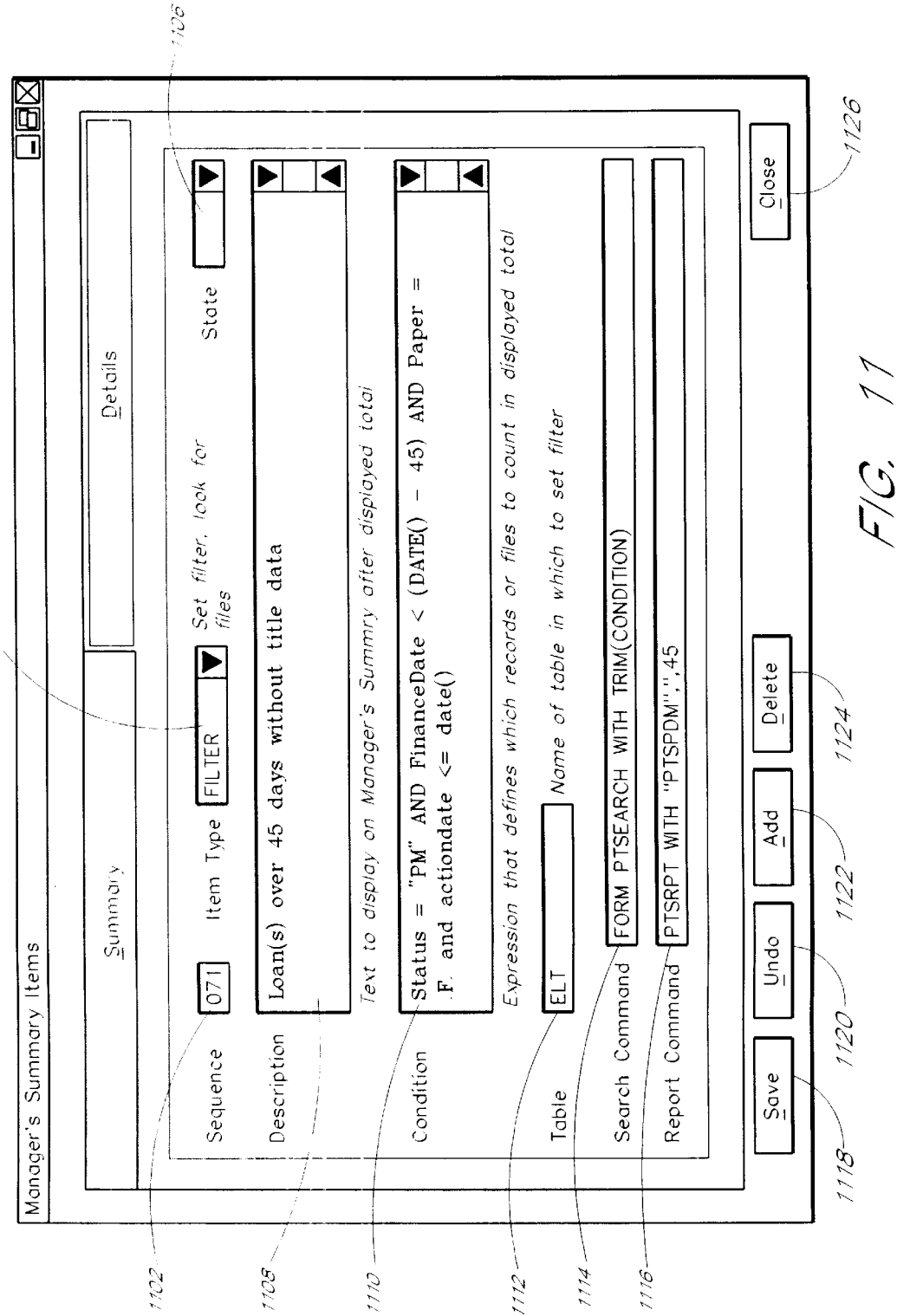
FIG. 11 illustrates one embodiment of a Details entry form for a manager's summary report.

The client or VTTS operator may optionally specify the Manager's Summary content using one embodiment of a Details entry form 1100, as illustrated in FIG. 11. In one embodiment, a separate Details entry form 1100 is used to specify each item that is to be presented in the Manager's Summary Item 1300, illustrated in FIG. 13. However, in another embodiment, one form may be used to specify several items or occurrences that are to be presented in the Manager's Summary Item 1300. The VTTS 2, via a series of commands, searches through the appropriate VTTS databases for entries or records that have characteristics which match the characteristics specified in the Details entry form 1100.

The Details entry form 1100 includes a Sequence field 1102, an Item Type field 1104, a State field 1106, a Description field 1108, a Condition field 1110, a Table field 1112, a Search Command field 1114, and a Report Command field 1116. The field functions are described below.

The Sequence field 1102 is used to specify where the item specified by the Details entry form 1100 should appear in the Manager's Summary Items 1300. For example, in one embodiment, the Manager's Summary Items displays items specified by multiple Details forms in ascending order according to the number entered into the Details forms'respective Summary fields. Thus, if five Details forms have respective sequence numbers of 10, 30, 71, 73 and 100, the item associated with the sequence number 10 would appear first, followed by the item associated with the number 30, which would be followed the item associated with the number 71, and so on.

The Item Type field 1104 is used to specify which parameter is to be used in generating the summary item. For example, an operator may select either a filter, a file name, such as all files. In one embodiment, the selection is accomplished via a drop-down menu. The menu is displayed by clicking on the down-arrow in the Item Type 1104 using a mouse or the like. When the filter option is selected, as in the form 1100 illustrated in FIG. 11, the VTTS uses the condition specified in the Condition field 1110 to search for corresponding items and to generate the line item summary in the Manager's Summary Items form 1300. Typically, an operator enters the desired condition. For example, if an operator specifies the condition as:

Status=*"PM"* AND FinanceDate<(Date( )-45) AND Paper=.F.
AND actiondate<=date( )

where:

PM indicates those loans for which no corresponding title has been received FinanceDate<(Date( )-45) indicates those loans which were financed over 45 days ago Paper=.F indicates that paper titles should not be tracked actiondate<=date( ) indicates that no action date "grace period" is running. An action date indicates that an initial action has been taken, where the actiondate variable is related to the amount of time allowed for a response to the action. For example, if the DMV failed to transmit the title, and, in response to the failure, the VTTS generated a communication to the DMV requesting the title, a deadline or grace period may be set. Optionally, no further action will be taken by the VTTS on the matter until the grace period has elapsed, thereby allowing the DMV time to respond. then the corresponding Manager's Summary Items form will provide information on how many loans over 45 days old are without electronically received titles. In another embodiment, a drop-down menu may be used to select from a list of predetermined search conditions.

The Table field 1112 is used to select the table in which to set the filter. The filter condition is used to limit the search based on the filter condition. Thus, the search may be performed more efficiently and faster. Furthermore, because the filter may be used to eliminate groups titles or financial interests searched, the resulting report is shorter, more understandable, and will not include unwanted information. For example, an operator may select the common table described above by entering the common table name "ELT" into the Table field 1112. Alternatively, the operator may enter a state specific name or two letter state code, such as CA for California or WA for Washington, to select the corresponding state specific table.

The Search Command field 1114 is used to specify the search. For example, an entry of "FORM PTSEARCH WITH TRIM(CONDITION)" causes the perfected title form to be searched, using the condition set in the Condition field 1110. The TRIM command deletes all trailing spaces from the condition entered into the Condition field 1110.

The search for loans that meet the condition criteria may be further limited using other Details form fields. For example, an operator may limit the search to cars registered in a specific state using the State field 1106. In one embodiment, the operator selects the desired state either using a drop-down menu or by entering a two character state code (e.g., "CA" for California) in the State field 1106. In another embodiment, the operator may restrict the search to group of states.

The text entered into the Description field 1108 is displayed in the Manager's Summary Items form 1300 in association with the specified item. Thus, as illustrated in the exemplary Manager's Summary Items form 1300, the item 1314 reports that there are "38 Loan(s) over 45 days without title data." The Search Report command field 1116 is used to specify the report format. For example, PTSRPT is the report module, while PTSPDM (Pending DMV report) is one of many predetermined report formats.

The soft keys at the bottom of the Details form 1100 perform a variety of functions. Actuating the Save key 1118 using a mouse or a keyboard causes the Details form data, including any changes, to be saved. Actuating the Undo key 1120 "undoes" any changes. Actuating the Add key 1122 causes a new Details form to be presented. Actuating the Delete key 1124 causes the item associated with current Details form to be deleted. Actuating the Close key 1126 causes the Details form to be closed.

FIG. 12 illustrates one embodiment of an exemplary Summary Items form 1200 for the manager's summary report. The Summary Items form 1200 advantageously provides a summary of the item data entered into one or more Details entry forms. Each row of the Summary Items form 200 corresponds to a corresponding item. The Summary Items form 1200 includes multiple columns, including a Sequence column 1202, an Item Type column 1204, a State column 1206, and Description column 1208, a Condition column 1210, and a Search command column 1212. These columns correspond to the Details form fields. If a data entry in a column is too long to be displayed then only a portion of that data is displayed. In one embodiment, an operator may change the width of a column by appropriately dragging the left or the right side of the column. Similarly, an operator may change the height of a row by appropriately dragging the top or the bottom side of the row. In another embodiment, an operator may optionally specify the columns to be displayed.

The exemplary form illustrated in FIG. 12 presents a summary of 13 items. An item 1218 corresponds to the data entered into the exemplary Details entry form 1100 illustrated in FIG. 11 and to the summary line item 1314. An item 1214 corresponds to the summary line item 1310, an item 1216 corresponds to the summary line item 1312, an item 1229 corresponds to the summary line item 1316, and an item 1222 corresponds to the summary line item 1318.

Figure 14:
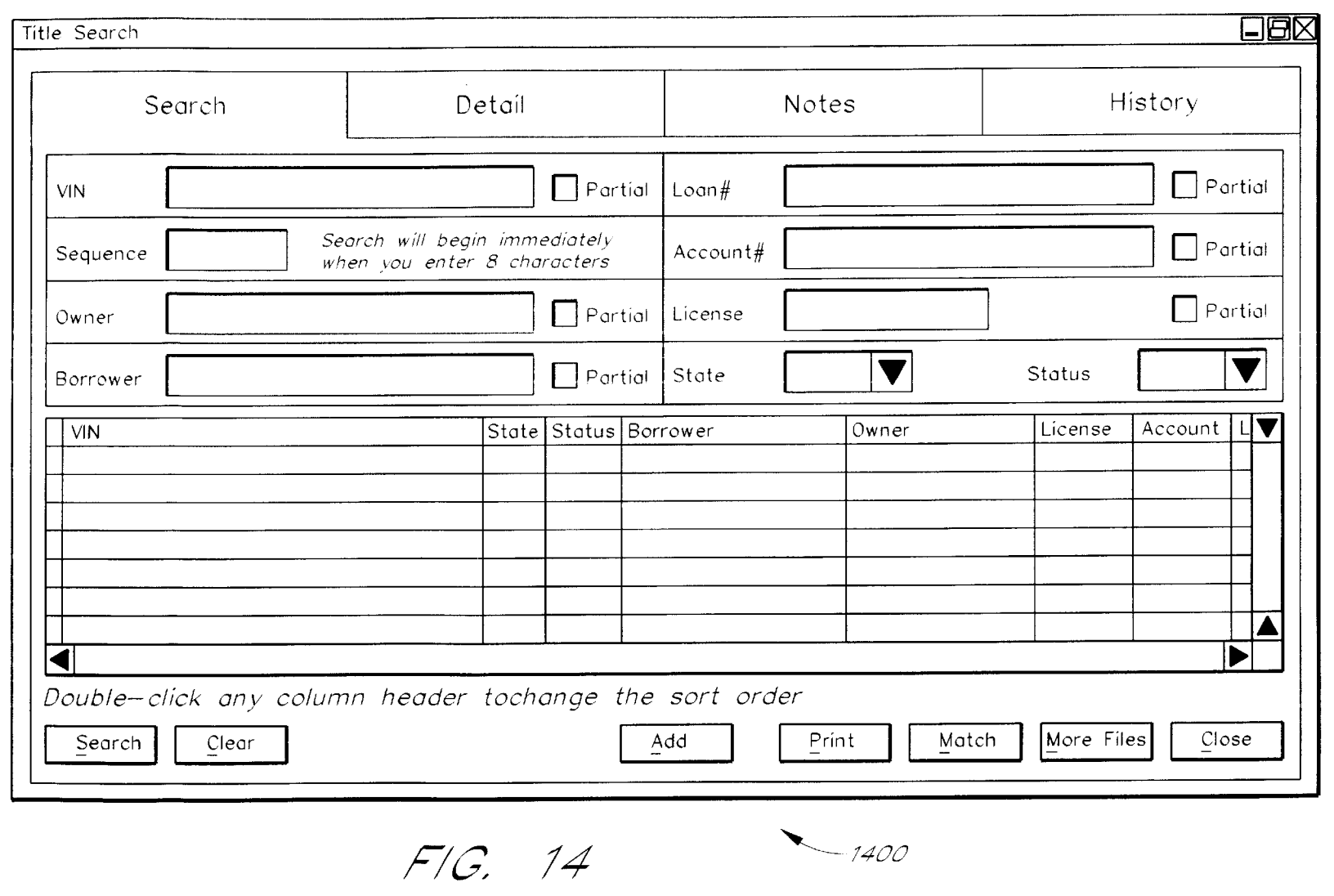

In another embodiment, as Search form, as illustrated in FIG. 14, is provided which allows to user to specify a variety of parameters for a title search. For example a user request of all titles having a VIN beginning with certain characters. Similarly the search may be based on accounts or licensees beginning with certain characters. Additionally, the search may be based on the owner's name.

While certain preferred embodiments of the invention have been described, these embodiments have been presented by way of example only, and are not intended to limit the scope of the present invention. Accordingly, the breadth and scope of the present invention should be defined only in accordance with the following claims and their equivalents.

What is claimed is:

1. A method of validating a vehicle identification number (VIN), comprising the acts of:

receiving in a computer system at least a first VIN having a plurality of characters, including letters, in a plurality of positions;

inspecting a first letter in a first position of said first VIN to determine if said first letter is included in a first set of valid characters using said computer system;

identifying said first letter as being in error when said first letter is not in said first set of valid characters using said computer system;

replacing said first letter with a first substitute letter using said computer system;

inspecting a second letter in a second position of said first VIN to determine if said second letter is included in a second set of valid characters using said computer system;

identifying said second letter as being in error when said second letter is not in said second set of valid characters using said computer system; and replacing said second letter with a second substitute letter using said computer system.

2. The method of validating a vehicle identification number (VIN) as defined in claim 1, wherein said VIN includes at least a vehicle make code, said act of inspecting further comprising the acts of:

comparing said vehicle make code with at least one valid vehicle make code; and providing an indication and correcting said vehicle make code when comparison of said vehicle make code with said valid vehicle make code fails to find a match.

3. The method of validating a vehicle identification number (VIN) as defined in claim 1, wherein said VIN has at least a year code, said act of inspecting further comprising the acts of:

comparing said year code with a set of valid year codes; and providing an indication and correcting said year code when comparison of said year code with said set of year codes fails to find a match.

4. The method of validating a vehicle identification number (VIN) as defined in claim 1, wherein said VIN has at least a check code associated with at some of said positions, and said act of inspecting further comprises the act of determining if said check code is correct.

5. The method of validating a vehicle identification number (VIN) as defined in claim 1, further comprising the act of selecting said first substitute letter from a group of letters, said group consisting of at least one of B, C, E, F, G, M, N, P, U, V, X, and Z.

6. The method of validating a vehicle identification number (VIN) as defined in claim 1, wherein said first substitute letter is an N when said first letter in error is an M.

7. The method of validating a vehicle identification number (VIN) as defined in claim 1, wherein said first substitute letter is an E when said first letter in error is a B.

8. The method of validating a vehicle identification number (VIN) as defined in claim 1, wherein said first substitute letter is an E when said first letter in error is an F.

9. The method of validating a vehicle identification number (VIN) as defined in claim 1, wherein said first substitute letter is an F when said first letter in error is a P.

10. The method of validating a vehicle identification number (VIN) as defined in claim 1, wherein said first substitute letter is a T when said first letter in error is a J.

11. The method of validating a vehicle identification number (VIN) as defined in claim 1, wherein said first substitute letter is a G when said first letter in error is a C.

12. The method of validating a vehicle identification number (VIN) as defined in claim 1, wherein said first substitute letter is a U when said first letter in error is a V.

13. The method of validating a vehicle identification number (VIN) as defined in claim 1, wherein said first substitute letter is a[n] V when said first letter in error is a U.

14. A method of validating a vehicle identification number (VIN), comprising the acts of:

comparing a VIN vehicle make code with at least one valid vehicle make code;

comparing a VIN year code with at least one valid year code;

comparing a VIN check code is correct with a calculated check code;

providing a first indication when a first of said comparisons fails to find a match;

automatically performing a first correction on said VIN at least partly in response to said first indication, providing a second indication when a second of said comparisons fails to find a match; and automatically performing a second correction on said VIN at least partly in response to said second indication.

15. An apparatus used to validate a vehicle identification number (VIN), said apparatus having memory to store instructions, said apparatus comprising:

at least a first instruction used to inspect a first letter in a first position of said VIN and a second letter in a second position in said VIN to determine if said first letter is included in a first set of valid letters and if said second letter is included in a second set of valid letters;

at least a second instruction used to identify said first letter as being in error when said first letter is not in said first set of valid letters and when said second letter is not in said second set of valid letters; and at least a third instruction used to automatically replace said first letter with a first substitute letter upon said first letter being identified as being in error and to automatically replace said second letter with a second substitute letter upon said second letter being identified as being in error.

16. The apparatus as defined in claim 15, said apparatus further comprising:

at least a fourth instruction used to compare a VIN vehicle make code with at least one valid vehicle make code;

at least a fifth instruction used to provide an indication when comparison of said vehicle make code with said at least one valid vehicle make code fails to find a match; and at least a sixth instruction used to correct said vehicle make code in response to said indication.

17. The apparatus as defined in claim 15, said apparatus further comprising:

at least a fourth instruction used to compare a VIN year code with at least one valid year code;

at least a fifth instruction used to provide an indication when comparison of said year code with said at least one valid year code fails to find a match and at least a sixth instruction used to correct said year code in response to said indication.

18. The apparatus as defined in claim 15, said apparatus further comprising at least a fourth instruction used to determine if a VIN check code is correct.

19. A method of validating a vehicle identification number (VIN), comprising the acts of:

inspecting at least a first VIN having a plurality of character positions;

determining if a first character in a first of said character positions is in a selection of valid characters;

indicating a first error condition when said first character is not in said selection of valid characters;

automatically replacing said first character with a first alternate character when said first error condition occurs;

determining if a second character in a second of said character positions is in a selection of valid characters;

indicating a second error condition when said second character is not in said selection of valid characters automatically replacing said second character with a second alternate character when said second error condition occurs.

20. The method of validating a vehicle identification number (VIN) as defined in claim 19, further comprising the act of inspecting said VIN after after replacing said first character to determine if said VIN has an improper character at at least one character position.

21. A means for validating a vehicle identification number (VIN), said means comprising:

a means for receiving at least a first VIN having a plurality of positions;

a means for inspecting at least a first letter in a first position of said first VIN to determine if said first letter is included in a first set of valid letters;

a means for identifying said first letter as being in error when said first letter is not in said first set of valid letters; and a means for automatically replacing said first letter with a substitute letter.

* * * * *

UNITED STATES PATENT AND TRADEMARK OFFICE
CERTIFICATE OF CORRECTION

PATENT NO. : 6,259,354 B1
DATED : July 10, 2001
INVENTOR(S) : Troy Underwood

It is certified that error appears in the above-identified patent and that said Letters Patent is hereby corrected as shown below:

<u>Column 13,</u>
Line 66, please delete "a[n]" and insert therefore, -- a --.

<u>Column 15,</u>
Line 14, please delete "after after" and insert therefore, -- after --.

Signed and Sealed this

Twenty-eighth Day of October, 2003

JAMES E. ROGAN
*Director of the United States Patent and Trademark Office*